(12) United States Patent
Roundtree et al.

(10) Patent No.: US 10,552,896 B2
(45) Date of Patent: Feb. 4, 2020

(54) METHOD AND SYSTEM FOR VIRTUAL INVENTORY MANAGEMENT

(71) Applicant: The Fisher Family Dynasty Trust Dated July 19, 2007, Yellow Springs, OH (US)

(72) Inventors: Kevin Roundtree, Xenia, OH (US); Trent Fisher, Yellow Springs, OH (US); Robert Lord, Bellbrook, OH (US)

(73) Assignee: The Fisher Family Dynasty Trust, Yellow Springs, OH (US), dated Jul. 19, 2007

( * ) Notice: Subject to any disclaimer, the term of this patent is extended or adjusted under 35 U.S.C. 154(b) by 419 days.

(21) Appl. No.: 15/612,237

(22) Filed: Jun. 2, 2017

(65) Prior Publication Data
US 2018/0033076 A1    Feb. 1, 2018

Related U.S. Application Data

(60) Provisional application No. 62/369,389, filed on Aug. 1, 2016.

(51) Int. Cl.
| | | |
|---|---|---|
| *G06Q 30/00* | (2012.01) | |
| *G06Q 30/06* | (2012.01) | |
| *G06K 3/00* | (2006.01) | |
| *G06K 7/14* | (2006.01) | |
| *G06Q 10/08* | (2012.01) | |

(52) U.S. Cl.
CPC .......... *G06Q 30/0637* (2013.01); *G06K 3/00* (2013.01); *G06K 7/1413* (2013.01); *G06Q 10/087* (2013.01)

(58) Field of Classification Search
CPC .... G06Q 30/0637; G06Q 10/087; G06K 3/00; G06K 7/1413
See application file for complete search history.

(56) References Cited

U.S. PATENT DOCUMENTS

| | | | |
|---|---|---|---|
| 7,543,743 B1 | 6/2009 | Yu et al. | |
| 2005/0074246 A1* | 4/2005 | Hayward | G06Q 30/02 399/8 |
| 2009/0288011 A1 | 11/2009 | Piran et al. | |
| 2010/0161345 A1* | 6/2010 | Cain | G06F 19/328 705/2 |
| 2010/0293066 A1 | 11/2010 | Kimi et al. | |

(Continued)

FOREIGN PATENT DOCUMENTS

| | | |
|---|---|---|
| WO | 2015048687 | 6/2015 |
| WO | 2015084687 A1 | 6/2015 |

OTHER PUBLICATIONS

Clark, Robert N., Douglas C. Fosth, and Vincent M. Walton. "Detecting instrument malfunctions in control systems." IEEE Transactions on Aerospace and Electronic Systems 4 (1975): 465-473. (Year: 1975).*

(Continued)

*Primary Examiner* — Matthew E Zimmerman
(74) *Attorney, Agent, or Firm* — Thomas E. Lees, LLC

(57) ABSTRACT

Methods and systems for virtually managing product inventory from an application on a smart device through at least one of a bar code scanning feature, an integration of a virtual toolbox component and a shopping cart component, and a checkout selection option to request a purchase order associated with a user token authorization.

16 Claims, 12 Drawing Sheets

(56) References Cited

U.S. PATENT DOCUMENTS

| | | | |
|---|---|---|---|
| 2011/0054935 A1* | 3/2011 | Hardaway | G06F 19/328 |
| | | | 705/3 |
| 2013/0153657 A1 | 6/2013 | Loughrey et al. | |
| 2015/0178654 A1* | 6/2015 | Glasgow | G06Q 10/06315 |
| | | | 705/7.25 |
| 2015/0363866 A1* | 12/2015 | Depew | G06Q 30/0633 |
| | | | 705/26.8 |
| 2016/0218884 A1* | 7/2016 | Ebrom | D06F 33/02 |
| 2016/0275424 A1* | 9/2016 | Concannon | G06Q 10/06312 |

OTHER PUBLICATIONS

Wang, Xin; Notification of Transmittal of International Preliminary Report on Patentability for International Patent Application PCT/US2017/035710; The International Bureau of WIPO; Geneva, Switzerland; dated Feb. 14, 2019.

International Search Report and Written Opinion dated Sep. 7, 2017 filed in International Application No. PCT/US2017/035710.

* cited by examiner

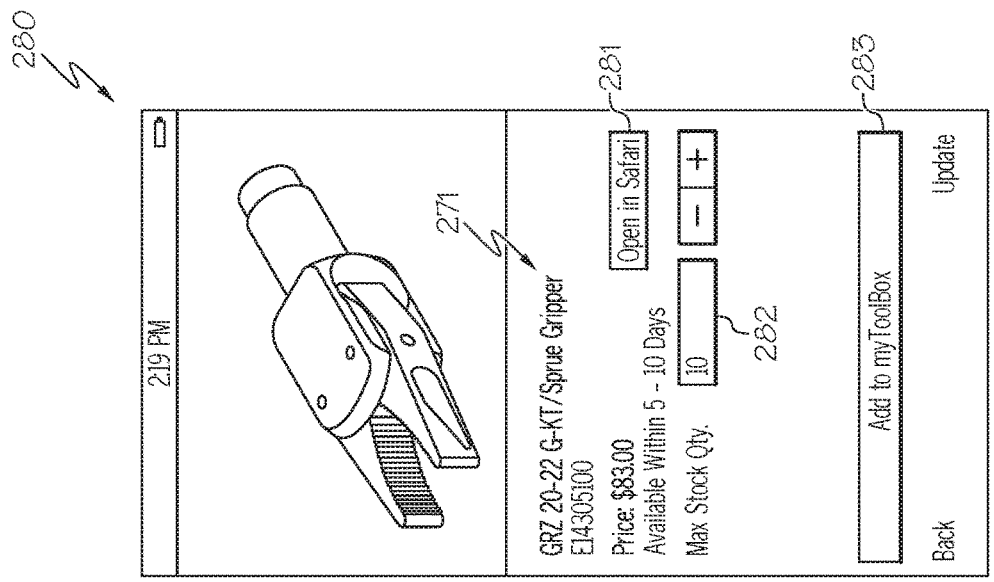

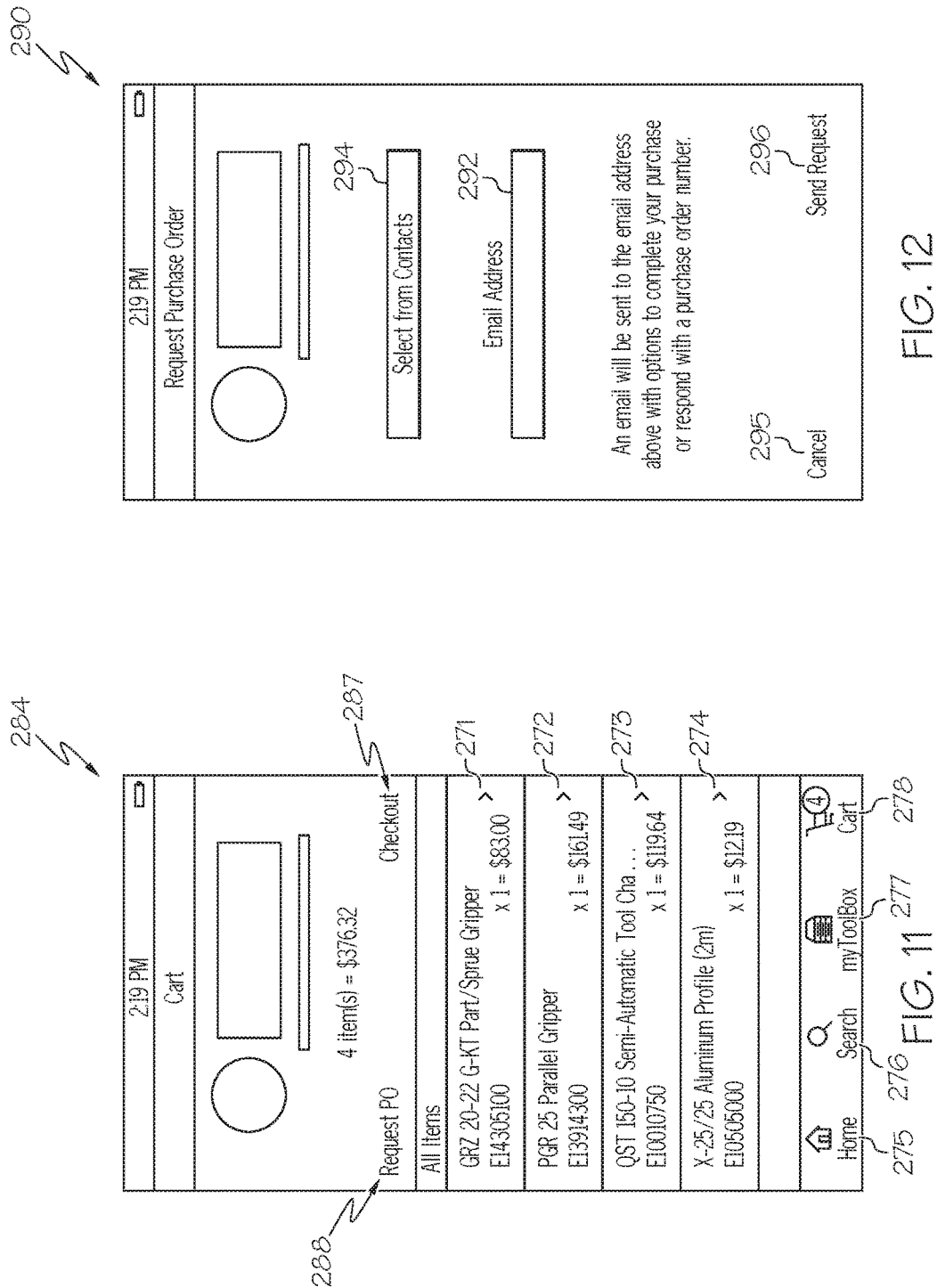

METHOD AND SYSTEM FOR VIRTUAL INVENTORY MANAGEMENT

CROSS REFERENCE TO RELATED APPLICATIONS

The present specification claims priority to U.S. Provisional Patent Application Ser. No. 62/369,389, filed Aug. 1, 2016, which is commonly-owned and entitled "VIRTUAL INVENTORY MANAGEMENT TOOLS AND METHODS OF USE," the entirety of which is incorporated by reference herein.

TECHNICAL FIELD

The present specification generally relates to tools to virtually manage product inventory from a smart device software application and, more specifically, to tools to virtually manage product inventory from a smart device software application through an integration of a virtual toolbox component and a virtual shopping cart component, a bar code scanning feature, and/or a checkout selection option to request a purchase order associated with a user token authorization, and methods of use of such tools.

BACKGROUND

Users may utilize a vendor or manufacturer website to order products to manage inventory at, for example, a personal computer. However, users typically search for a specific product on the website, enter a quantity to order, and checkout to process the order, or separately wait to checkout the order until obtaining a purchase order approval.

Accordingly, as the above steps are disjointed and dependent on user search and input, a need exists for alternative tools to streamline the inventory management process and methods of use of such tools.

SUMMARY

According to the subject matter of the present disclosure, and in one embodiment, a method for virtually managing product inventory from an application on a smart device through at least one of a bar code scanning feature, an integration of a virtual toolbox component and a shopping cart component, and a checkout selection option to request a purchase order associated with a user token authorization as shown and described herein is within the scope of the disclosure.

In accordance with one embodiment of the present disclosure, a method for virtually managing a product inventory from an application on a smart device may include entering a login to the application on a graphical user interface (GUI) of the smart device by a user, receiving a user token authorization based on the login, selecting a product from the product inventory to generate a selected product associated with the user token authorization, adding an order quantity of the selected product associated with the user token authorization to a virtual shopping cart as an order, and processing the order. The product may be selected from one or more search options on the GUI that may include a product search option in a virtual toolbox of the application, the virtual toolbox configured to store one or more products from the product inventory, an online catalog option, and a bar code scanning feature configured to scan a bar code associated with the selected product. The virtual shopping cart may be configured for integration with the virtual toolbox such that selection of the selected product from the virtual toolbox is configured to generate an option to auto-populate the virtual shopping cart with the selected product.

In accordance with another embodiment of the present disclosure, a system for virtually managing product inventory from an application on a mobile smart device may include a server and the mobile smart device. The mobile smart device may include a processor communicatively coupled to the server and a non-transitory computer-readable memory storing instructions that, when executed by the processor and through the application, cause the processor to: receive a login to the application through a graphical user interface (GUI) of the smart device by a user, receive a user token authorization from the server based on the login, receive a selection of a product from the product inventory to generate a selected product associated with the user token authorization, add an order quantity of the selected product associated with the user token authorization to a virtual shopping cart as an order, and process the order. The product may be selected from one or more search options on the GUI that may include a product search option in a virtual toolbox of the application, the virtual toolbox configured to store one or more products from the product inventory, an online catalog option, and a bar code scanning feature configured to scan a bar code associated with the selected product. The virtual shopping cart may be configured for integration with the virtual toolbox such that selection of the selected product from the virtual toolbox is configured to generate an option to auto-populate the virtual shopping cart with the selected product.

In accordance with yet another embodiment of the present disclosure, a system for virtually managing a product inventory from an application on a mobile smart device may include a server and the mobile smart device. The mobile smart device may include a processor communicatively coupled to the server and a non-transitory computer-readable memory storing instructions that, when executed by the processor and through the application, cause the processor to: receive a login to the application through a graphical user interface (GUI) of the smart device by a user, receive a user token authorization from the server based on the login, receive a selection of a product from the product inventory to generate a selected product associated with the user token authorization, receive detail of a maximum stock level associated with the selected product, receive detail of a current inventory level associated with the selected product, generate a recommended order quantity as the order quantity based on the maximum stock level and the current inventory level, add an order quantity of the selected product associated with the user token authorization to a virtual shopping cart as an order, and process the order.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 is a screenshot view of an example listing of items in a virtual toolbox associated with the smart device application of FIGS. 1 and/or 2, according to one or more embodiments shown and described herein;

FIG. 10 is a screenshot view of an example item from the virtual toolbox of FIG. 9 to add to a virtual shopping cart associated with the smart device application of FIGS. 1 and/or 2, according to one or more embodiments shown and described herein;

FIG. 11 is a screenshot view of an example item list in a virtual shopping cart associated with the smart device application of FIGS. 1 and/or 2, according to one or more embodiments shown and described herein;

FIG. 12 is a screenshot view of an example purchase order request feature selectable from a virtual shopping cart associated with the smart device application of FIGS. 1 and/or 2, according to one or more embodiments shown and described herein;

DETAILED DESCRIPTION

Figure 1:
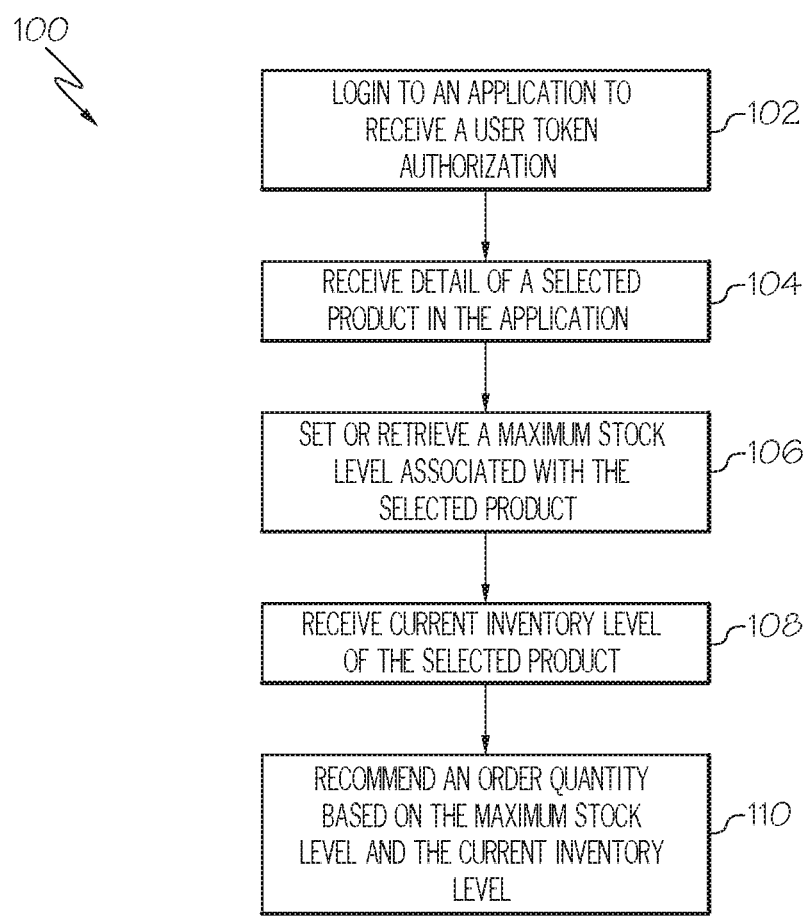
FIG. 1 is a flow chart of a process for recommending an order quantity of a selected product through a smart device application based on a maximum stock level and a current inventory level associated with the product, according to one or more embodiments shown and described herein.

Referring generally to the figures, embodiments of the present disclosure are directed to tools for virtually managing product inventory from an application on a smart device through at least one of a bar code scanning feature, an integration of a virtual toolbox component and a shopping cart component, and a checkout selection option to request a purchase order associated with a user token authorization, including a secure order checkout process. The smart device may be an iOS device or Android device, for example. Further, as will be described in greater detail below, the smart device application may be linked to monitoring data generated by sensors associated with a robot to notify a user about a need to re-order parts on a manufacturing process line. For example, the robot may be a gripper that is part of a manufacturing process that monitors an associated tool or product handled by the gripper to notify an operator of tool malfunction of the associated tool during the manufacturing process. Notification of the tool malfunction may also trigger an order of the tool or malfunctioning tool components within the application tool to virtually manage inventory as described herein. Reference will now be made in detail to embodiments of the tools to virtually manage product inventory from an application on a smart device, examples of tools and systems are illustrated in the accompanying drawings. Wherever possible, the same reference numerals will be used throughout the drawings to refer to the same or like parts. Various embodiments of the tools will be described in further detail herein with specific reference to the appended drawings.

In an embodiment, an application tool as described herein includes four main navigation controller based routes, with each route linked to a tab icon at, for example, a footer of the application tool. A home tab is a main application starting page that welcomes the user and provides links to other application routes. A search tab allows the user to search for products to order as described herein by either, for example, scanning a barcode, by entering text into an input field, or by browsing an online catalog mobile website. A myToolBox tab displays a list of items that have been added to a virtual toolbox to allow the user to select an item and update an associated maximum stocking level. The virtual toolbox assists a user with keeping records of components over time, such as a history of previous orders and/or a usage history, product detail, and the like. Further, a cart tab displays a list of items that have been added to a virtual shopping cart. The user may request purchase orders from the virtual shopping cart, update or remove cart items, and/or checkout from the cart tab section. The requested purchase orders may be sent to an email designated by the user for approval along with a URL including the user authentication token as described in greater detail below. Once a purchase order is approved, the approver may continue to process the order and checkout on behalf of the user using the user authentication token, or the user may receive the approved purchase order and continue the checkout process. Thus, the application tool allows users to access, manage inventory, and/or purchase products with ease in a streamlined manner while providing links and a seamless integration with a vendor and/or manufacturer's mobile online catalog website to assist the user with finding detailed product specification information as well as downloadable product CAD models.

The navigation controllers described herein may be view controllers that are a foundation of the application tools. Each view controller manages a portion of a user interface of the application tools described herein and the interactions between underlying data and the user interface as well as facilitating transitions between different user interface parts. The view controllers may manage a hierarchy of views and be content or container view controllers. Content view controllers manages a discrete part of the content of the application tools described herein (including root and subset views) while container view controllers manages its own and other views by collecting other controller information (i.e., from child view controllers) to facilitate navigation or differently present the content of those child view controllers. In embodiments, the navigation controllers described herein act as view controllers that facilitate and manage interactions between managed views and data associated with the application tools. Such data may be stored as custom data objects, for example, managed by a document controller object that reads and writes data to storage such that the document controller object owns the data while the view controllers may store a copy of the data received to more easily update views. While in non-limiting examples described herein, the navigation/view controllers are iOS specific, and similar windows, tabs, view, and functions may be provided via Android and/or Windows OS implementation.

An example of the virtual shopping cart component of the application that is integrated with the application as described herein may be, for example, OPENCART, an open source shopping cart system for e-commerce online ordering systems. The application tool described herein utilizes an application program interface ("API") to integrate with OPENCART, for example, and to put and get data from the OPENCART database via HTTPS requests. The data is sent to the API is Java Script Object Notation ("JSON") format and is returned to the application in JSON format. In embodiments, the application may be able to launch 3D models of associated products from the application within another application meant to visually display the 3D model, as described in U.S. Provisional Patent App. No. 62/324,579, filed Apr. 19, 2016, entitled "Three Dimensional Launch Tools and Methods of Use," and which is commonly-owned and incorporated by reference in its entirety herein. Non-limiting examples of the 3D models may include, for example, computer-aided design ("CAD") files, computer-aided engineering ("CAE") files, computer-aided manufacturing ("CAM"), and/or other like computer-aided three-dimensional files. These 3D models may be viewable in software applications such as CAD software. Other software applications to view the 3D models may include applications that permit viewing, management, and/or manipulation of the 3D models. An example of such a viewing software application is the cloud-based tool FUSION 360™ by AUTODESK®, which is a 3D CAD, CAM, CAE tool that connects a product development process through a cloud-based platform.

Referring to FIG. 1, a flow chart of a process 100 for recommending an order quantity of a selected product through a smart device application based on a maximum stock level and a current inventory level associated with the product is shown. Thus, FIG. 1 is representative of at least a portion of a method for virtually managing a product inventory from an application on a smart device, the method including entering a login to the application on a graphical user interface (GUI) of the smart device by the user and receiving a user token authorization based on the login. For example, in step 102, a user may login to a virtual inventory management application on a smart device to receive a user token authorization. Upon approval of the login information, the system associates a user token authorization with the user. Information with respect to the authentication process, management, and operation of the user token authorization (e.g., a token for token authentication) is described in greater detail further below with respect to FIG. 15.

Figure 3:
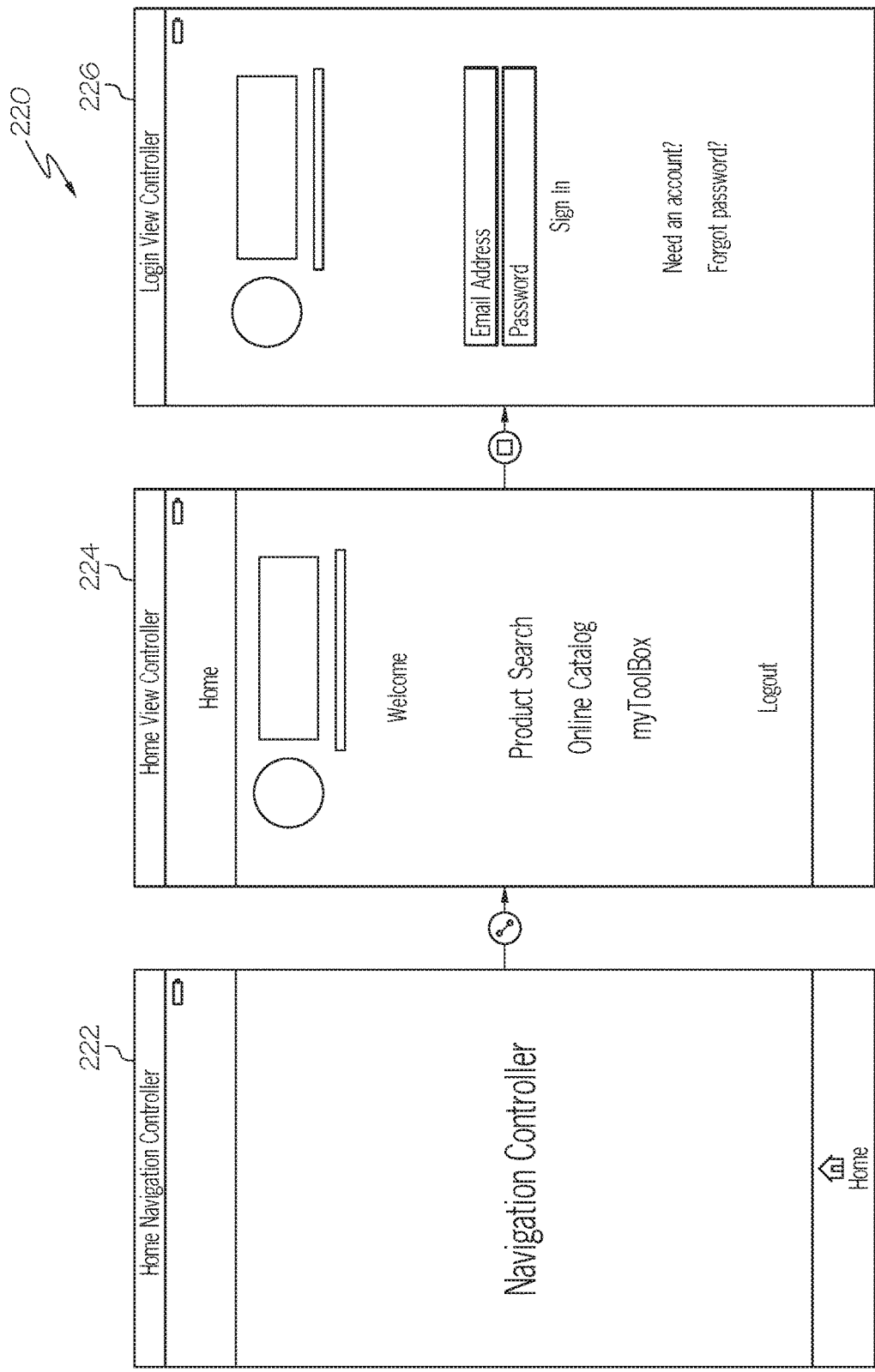
FIG. 3 is an example flow of screenshot views of a home navigation controller associated with the smart device application of FIGS. 1 and/or 2 to virtually manage inventory, according to one or more embodiments shown and described herein.

The user may login in step 102 to a screen through a login view controller 226 of the application, as shown in FIG. 3. For example, FIG. 3 shows an activation process 220 associated with step 102 of FIG. 1, in which a home navigation controller 222 (FIG. 3) navigates the user, who may be launching the application and/or has selected a home icon 275, to a home screen 224. The home screen 224 may be controlled by a home view controller and may include company information, a welcome message, a product search option, an online catalog option, a virtual toolbox option (such as "myToolBox" as shown in FIG. 3), and/or a log option. A log option may be "login" option for a user logging in or may be a "logout" option for a user logging out of the application. A login view controller 226 shows a user a screen from which to login into the application, which requests a user identification and password. A user may also be able to register for an account and/or retrieve a forgotten identification and/or password through the login view controller 226. A user may also access, through the home screen or another screen, support information, including sales information, customer service contact and/or help manual information, and other such technical assistance information.

Figure 4:
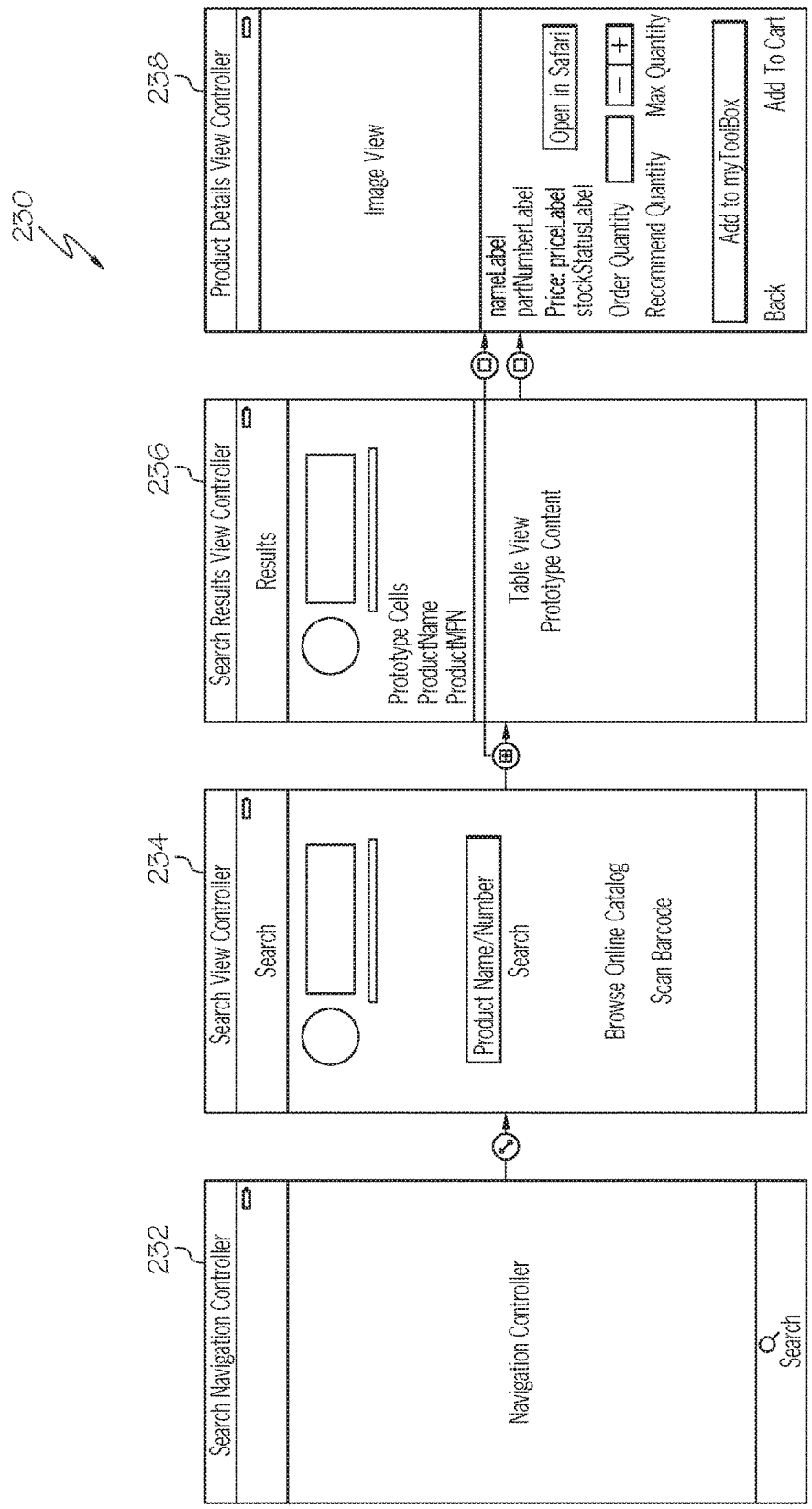
FIG. 4 is an example flow of screenshot views of a search navigation controller associated with the smart device application of FIGS. 1 and/or 2 to virtually manage inventory, according to one or more embodiments shown and described herein.

A user selecting the product search option or online catalog option on the home screen 224 of FIG. 3 may be further directed by a search control process 230 as shown in FIG. 4. For example, a search navigation controller 232 may direct the user to a search screen 234 controlled by a search view controller. The search screen 234 may include search options such as search by product name and/or number, browse online catalog, and scan barcode. The user, for example, may utilize an associated bar code scanner feature 330 (FIG. 14) to scan a physical product 332 (FIG. 14), for which scanned product information may be retrieved as search results and displayed on a results screen through the search results view controller 236 (FIG. 4). Such information may also be displayed after the user searches for and selects a product from an online catalog. Product information such as a product name and/or product part number may be displayed to the user, for example.

Referring back to FIG. 1, the method of the process 100 may include selecting a product from the product inventory to generate a selected product associated with the use token authorization. The product may be selected from one or more search options on the GUI. As described in greater detail further below, the one or more search options may include a product search option in a virtual toolbox of the application that is configured to store one or more products from the product inventory, an online catalog option, and a bar code scanning feature configured to scan a bar code associated with the selected product.

In step 104, detail of a selected product in the application is received, and such product detail may include product information displayable to the user. The method of the process 100 may further include selecting an option to receive detail of the selected product on the GUI, which detail may include at least one of a product name, a product part number, a product image, and a product price. For example, a product details view controller 238, as shown in FIG. 4, may display product detail information such as a price of the product, an order quantity option to input an amount of the selected product to order, a recommend quantity option and/or a select maximum quantity option (both of which will be described in greater detail below), an open in a website browser option (to open an associated vendor and/or manufacturer website, for example), an add to a virtual toolbox option, and an add to cart option. The user may also be shown a product image, an associated CAD model file that may be emailed to the user as described in U.S. Provisional Patent App. No. 62/324,579, which is commonly-owned and incorporated by reference in its entirety above], and a back option to return back to the search screens to search for different and/or additional products.

Referring back to FIG. 1, the method of the process 100 may include receiving detail of a maximum stock level associated with the selected product. The maximum stock level associated with the selected product may be configured to be input by a user or may be retrieved from storage in a memory of the smart device, for example. For example, in step 106, a maximum stock level associated with the selected product may be set or retrieved. For example, the product details view controller 238 of FIG. 4 includes a max quantity option. A stored maximum stock level associated with the selected product may be retrieved through this option. The maximum stock level may be set by a user through, for example, a virtual toolbox, as will be described in greater detail below with respect to FIGS. 6-7.

The product details view controller 238 of FIG. 4 also includes a recommend quantity option, which is a based on a current inventory level of the selected product and the maximum stock level. The method of the process 100 may further include receiving detail of a current inventory level associated with the selected product. The current inventory associated with the selected product may be configured to be input by a user or may be retrieved from storage in a memory of the smart device. For example, in step 108 of FIG. 1, a current inventory level of the selected product is received. A user may be prompted to input the current inventory level. Further, the method of the process 100 may further include generating a recommended order quantity as the order quantity based on the maximum stock level and the current inventory level In step 110 of FIG. 1, an order quantity based on the maximum stock level of step 106 and the current inventory level of step 108 is recommended to a user. The recommended order quantity may be representative of an amount of the selected product that the user should order to restock and manage inventory of an associated product. For example, the recommended order quantity would be the maximum stock level of step 106 less the current inventory level of step 108. As a non-limiting example, a selected product may have a maximum stock level of 10 that is retrieved and/or set in step 106, a current inventory level of 2 that is received in step 108, and the recommended order quantity would be 8 (the maximum stock level of 10 less the current inventory level of 2).

Figure 2:
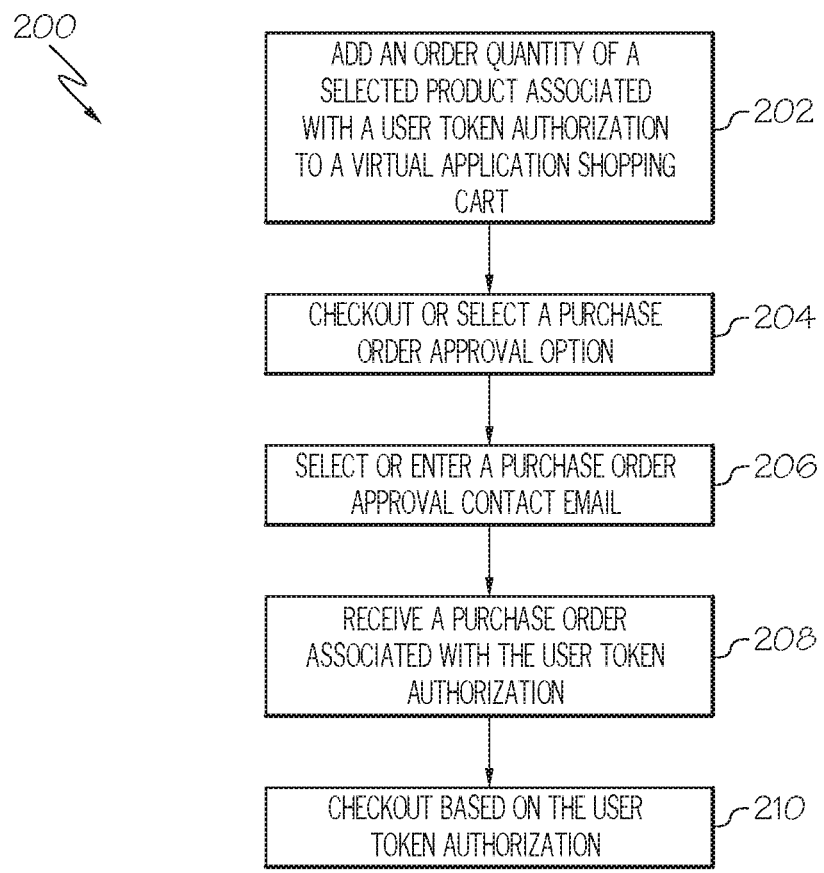
FIG. 2 is a flow chart of a process for adding a product order quantity associated with a user token authorization to a virtual shopping cart and selecting options to process the order, according to one or more embodiments shown and described herein.

FIG. 2 illustrates a flow chart of a process 200 including a step 202 for adding a product order quantity associated with a user token authorization to a virtual shopping cart along with steps 204-210 for selecting options to process the order. Thus, FIG. 2 is representative of at least a portion of a method for virtually managing a product inventory from an application on a smart device, the method including adding an ordering quantity of the selected product associated with the user token authorization to a virtual shopping cart as an order. The order quantity may be a user set quantity or the recommended order quantity of step 110 of FIG. 1. For example, the recommended order quantity of step 110 may be added to a virtual shopping cart and/or toolbox. The virtual shopping cart may be configured for integration with the virtual toolbox such that selection of the selected product from the virtual toolbox is configured to generate an option to auto-populate the virtual shopping cart with the selected product.

Referring back to FIG. 4, the product details view controller 238 of FIG. 4 includes an add to cart (i.e., a virtual shopping cart) along with an add to myToolBox option. When the recommended quantity is determined and/or the order quantity for the selected product is set, the user may select the add to cart option to add the product and the associated order quantity to the virtual shopping cart.

Figure 5:
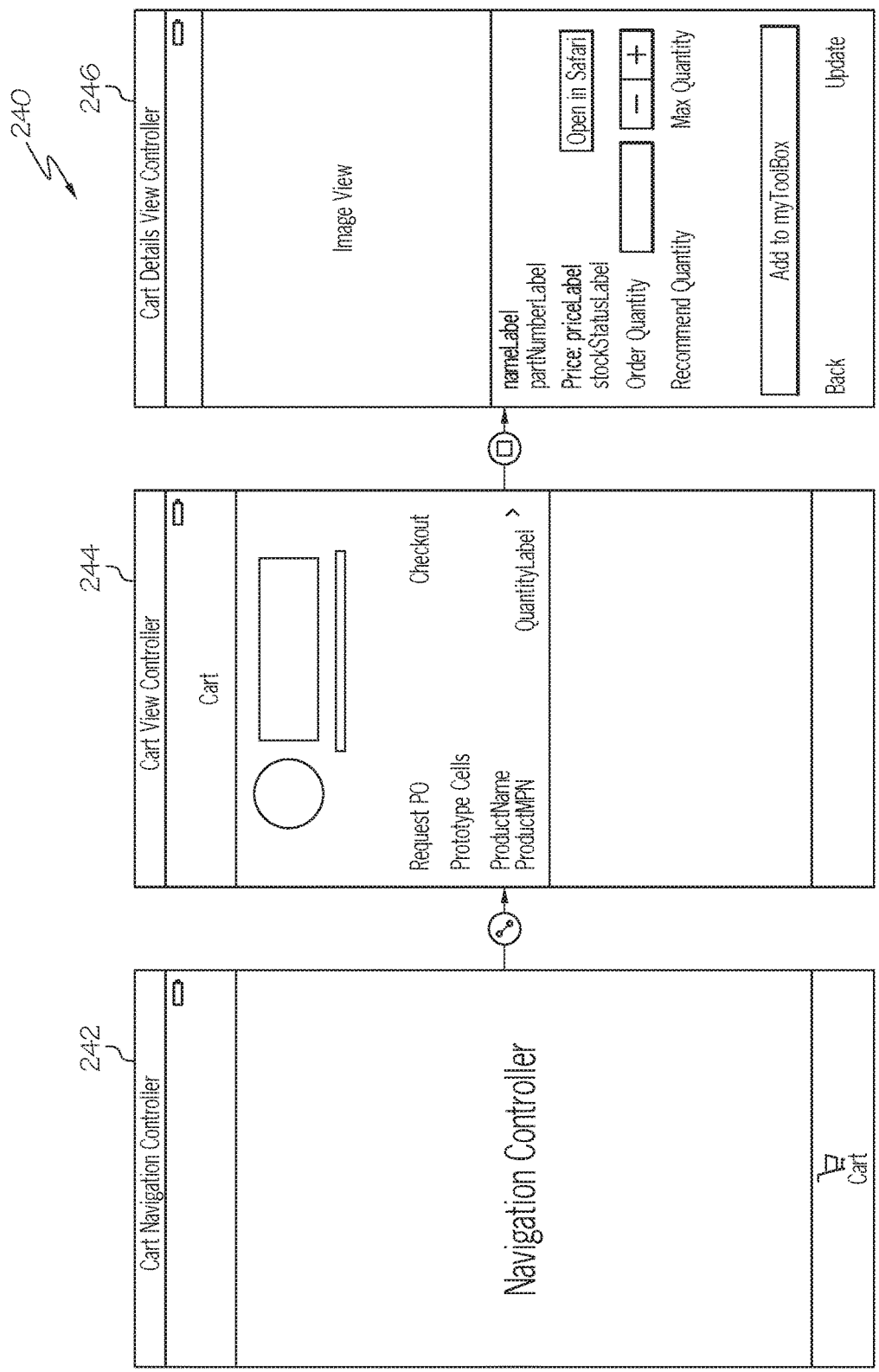
FIG. 5 is an example flow of screenshot views of a virtual shopping cart navigation controller associated with the smart device application of FIGS. 1 and/or 2 to virtually manage inventory, according to one or more embodiments shown and described herein.

FIG. 5 illustrates a virtual shopping cart control process 240 including a cart navigation controller 242 that directs a user to a cart view controller 244, which controls display of a cart screen including the selected product in the virtual shopping cart along with product information such as the product name, part number, and/or order quantity. The cart screen may include a list of selected products.

Selecting one of the selected products may cause a cart details view controller 246 to present the user with a screen including further details of the selected product in addition to product name and part number. The cart details view controller 246 may further allow a user to modify the order quantity as described above through a recommend quantity option, a max quantity option, or a set order quantity field option. Furthermore, if the selected product is not in the virtual toolbox, the user may select an option to add the product to the virtual toolbox. Thus, a method of the process 100 and/or the process 200 may include adding the selected product to the virtual toolbox of the application when the selected process is not found within the virtual toolbox.

The user may utilize an update button to update the order and the back button to return to the previous screen. Additionally or alternatively, the user may swipe the screen to the left to return to the previous screen, swipe the screen upwards to update the order, and/or swipe the screen to the right to go to the detailed product information screen for the next listed selected product. While swipe directions are describe above with respect to associated operations, it is within the scope of this disclosure that any swipe direction (left, right, up, or down) may be associated with any of the options described herein. Further, other forms of interactive application methods may be used, such as tapping the screen to edit items and/or swiping within other screens of the application. For example, swiping to the left may remove an item from the virtual shopping cart or the virtual toolbox, or swiping left or right may allow a user to view and access product detail information screen page by screen page.

Figure 6:
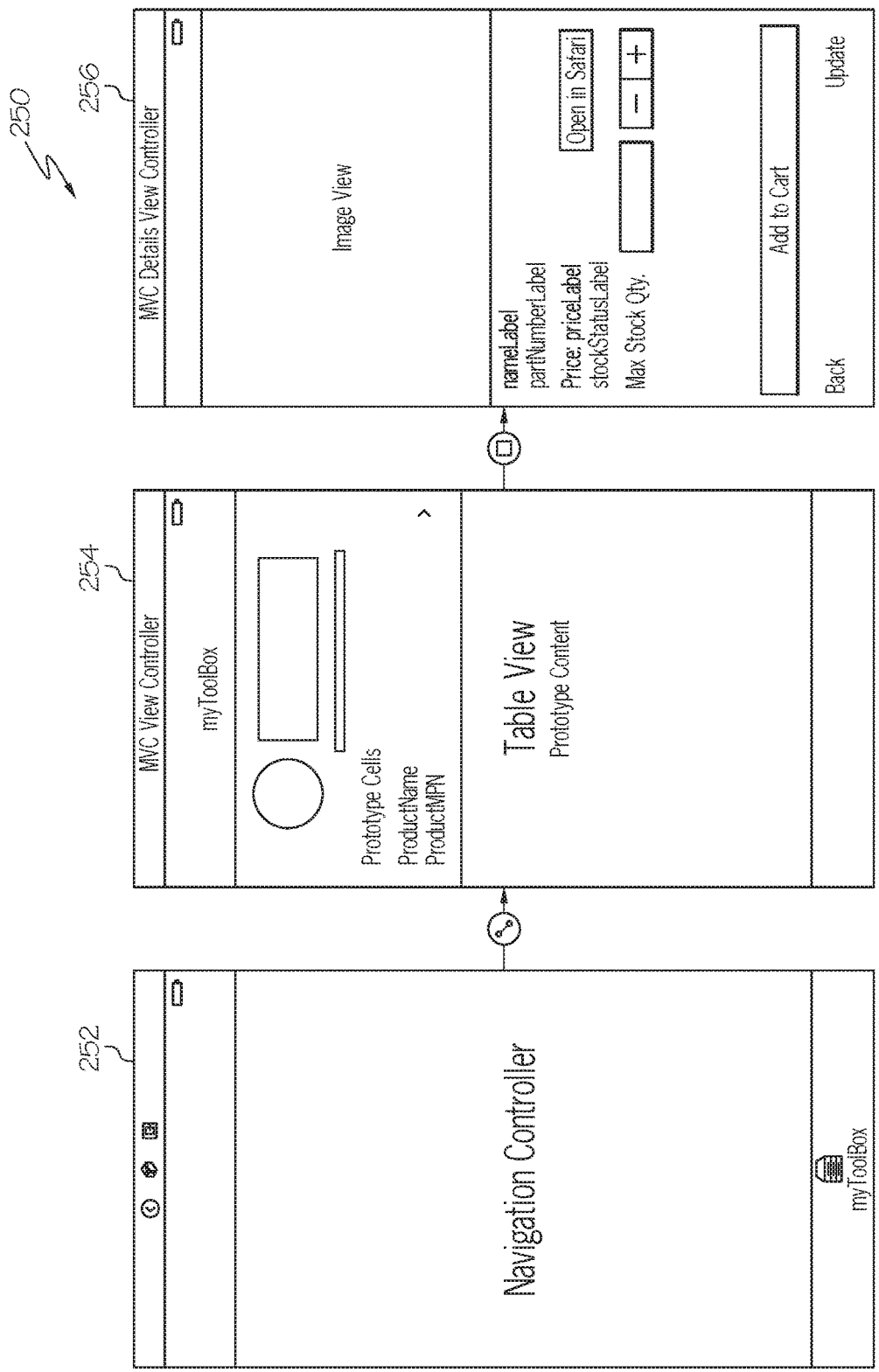
FIG. 6 is an example flow of screenshot views of a virtual toolbox navigation controller associated with the smart device application of FIGS. 1 and/or 2 to virtually manage inventory, according to one or more embodiments shown and described herein.

A user may select a virtual toolbox option to activate a virtual toolbox control process 250, as shown in FIG. 6, in which a toolbox navigation controller 252 directs the user to a virtual toolbox view controller 254. The virtual toolbox view controller 254 controls a toolbox screen that lists information of one or more products in the virtual toolbox such as product name and/or part number. Selection of one of the one or more listed products directs the user, through a virtual toolbox details view controller 256, to a product detail view screen listing information of the selected listed product and associated options. For example, information such as a listed product name, part number, price, stock level status (at the vendor and/or manufacturer site), an open in web browser option (to link to the vendor and/or manufacturer site), and maximum stock level status (i.e., an adjustable quantity) may be displayed to a user. The user may select an add to cart option (as shown in FIG. 6) to add a selected listed product from the virtual toolbox into the virtual shopping cart (either selecting an amount to order, or utilizing the cart details view controller 246 of FIG. 5 to set and/or recommend an order quantity as described above).

Figure 8:
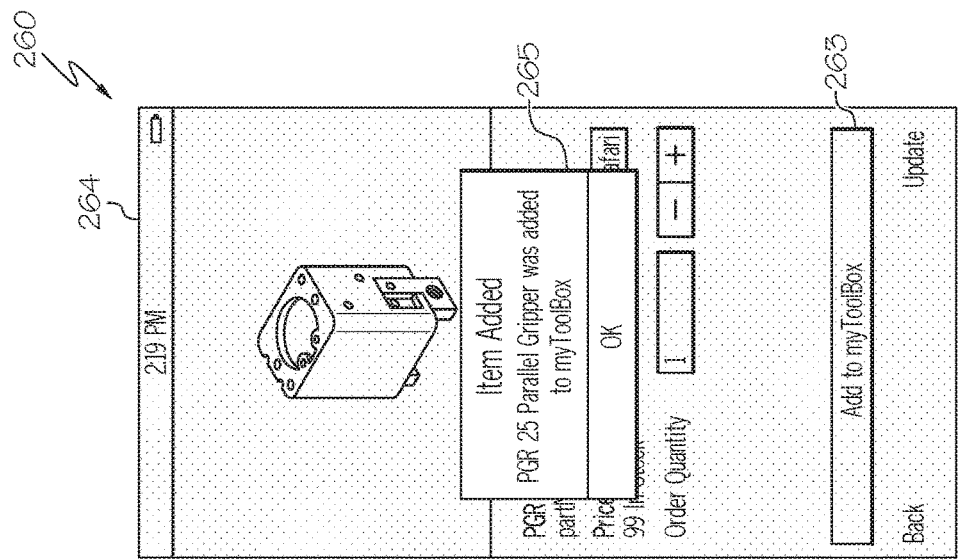
FIG. 8 is a screenshot view of an example item addition feature to add a product to a virtual toolbox associated with the smart device application of FIGS. 1 and/or 2, according to one or more embodiments shown and described herein.
Figure 7:
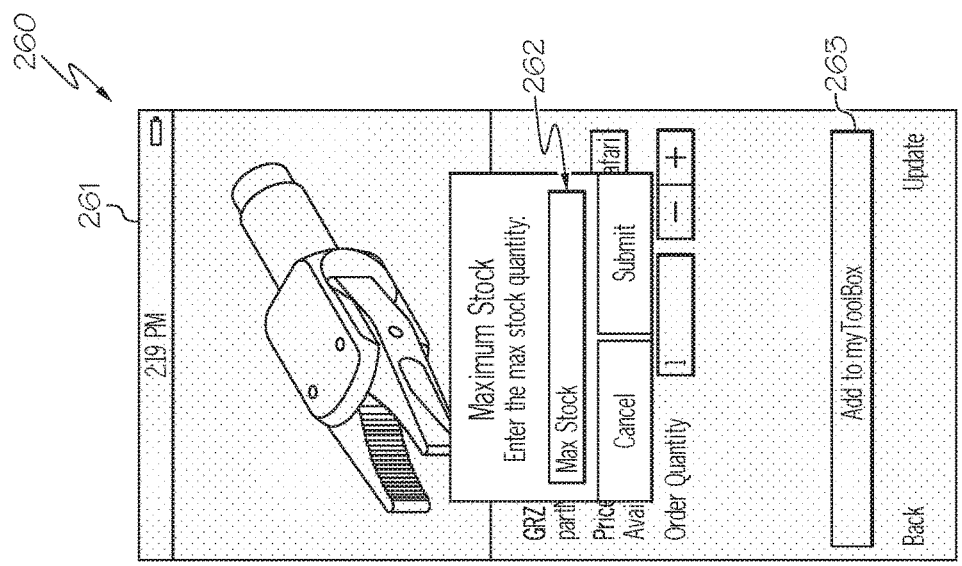
FIG. 7 is a screenshot view of an example maximum stock level selection feature to add a maximum stock level to a virtual toolbox associated with the smart device application of FIGS. 1 and/or 2, according to one or more embodiments shown and described herein.

Referring to FIG. 7, the user may adjust the maximum stock level or quantity by being prompted by a virtual toolbox controller screen 260 to enter a maximum stock level into a box 262. From the screen 260, the user may also add the selected product to the virtual toolbox through an add button option 263. For example, as shown in FIG. 8, adding a selected product (such as the product shown on the screen 261 or the screen 264) to the virtual toolbox through the add button option 263 may launch a user notification 265 that the item has been added.

The virtual toolbox may display a list of added products. For example, FIG. 9 displays a screenshot view 270 of an example listing of products or items 271, 272, 273, and 274 in the virtual toolbox. At the footer or bottom of the screenshot view 270 are selectable icons such as a home icon 275, a search icon 276, a virtual toolbox ("myToolBox") icon 277, and a cart icon 278, any one of which a user may select to return to the associated navigation controllers, as described above with respect to FIGS. 3-6. In embodiments, a user may select one of the listed items 271-274 from the virtual toolbox to launch a detailed product information page from which to add the selected item/product into the virtual shopping cart. For example, a user may select the item 271 in FIG. 9 to launch a detailed product information page 280 as shown in FIG. 10 and associated with the item 271. The detailed product information page 280 may include a product image and list the product name of the item 271, an associated part number, price, availability information, an option 281 to open product information within an associated web browser, an adjustable maximum stock level 282, and add to cart option 283. A user may select the add to cart option 283 to add the selected product from the virtual toolbox to the item list of the virtual shopping cart screen 284 of FIG. 11, for example. Once the user has built a desired list of items in the virtual shopping cart screen 284, the user may continue with processing the order. In an embodiment, the desired list of items may provide separate pricing information and a total pricing that may be saved and/or emailed to the user or another individual as, for example, a quote. The cart icon 278 may also include a number indicative of an amount of products in the item list of the virtual shopping cart screen 284.

Referring back to FIG. 2, in step 204, a user may select a checkout option to process the order in the cart through a secured process or may select a purchase order approval option. The method of the process 100 and/or 200 may include selecting a checkout option prior to processing the order or selecting a purchase order approval option to receive a purchase order approval prior to processing the order. For example, referring to FIG. 5, the cart view controller 244 of the virtual shopping cart control process 240 displays such a "Request PO" (i.e., purchase order) option and a "Checkout" option. Similarly, the virtual shopping cart screen 284 of FIG. 11 displays a Checkout option 287 and a Request PO option 288. A user may opt to checkout with the desired order (such as through the Checkout option 287) or select a purchase order approval option (such as through the Request PO option 288).

Figure 13:
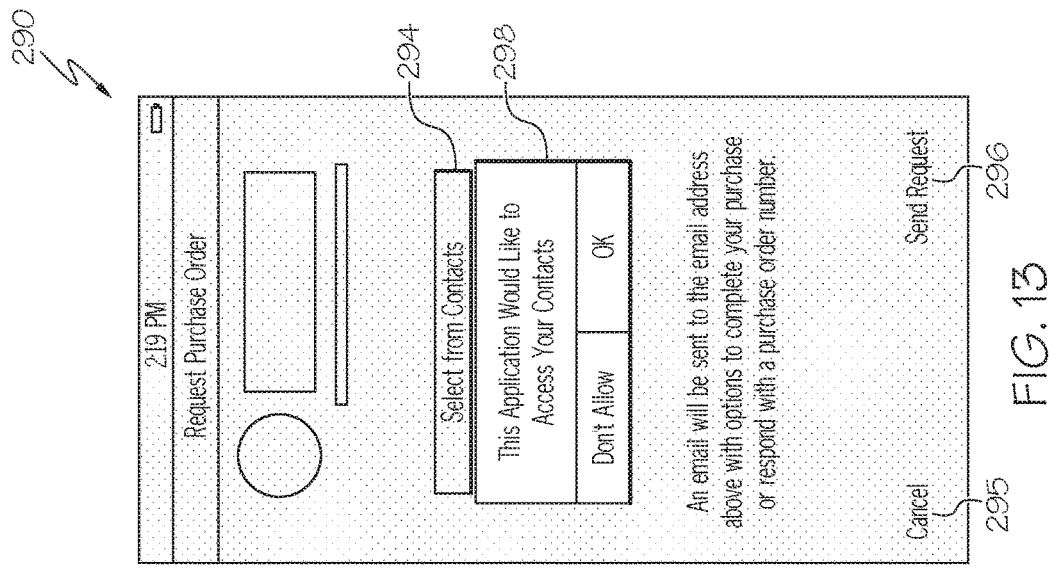
FIG. 13 is a screenshot view of the example purchase order request feature of FIG. 12 with a select from contacts option selected, according to one or more embodiments shown and described herein.

The method of the process 100 and/or 200 may further include, upon selecting a purchase order approval option to receive a purchase order approval prior to processing the order, selecting a purchase order approval contact, sending a purchase order approval request to the purchase order approval contact, and receiving the purchase order approval associated with the user token authorization from the purchase order approval contact. For example, if the user selects the purchase order approval option, the user may continue to step 206 of FIG. 2, in which the user selects or enters a purchase order approval contact email. For example, after selection of the Request PO option 288 of FIG. 11, a user may be directed to the screen 290 of FIG. 12. The screen 290 may include an email option 292 to enter an email and a selection option 294 to select an email from a list of contacts in, for example, the user's virtual address book. For example, if the user selects the selection option 294, the user may be prompted through a box 298 (FIG. 13) to allow the application to access the user's contacts from which the user may select the appropriate contact. The selected or entered email may be associated with an approval individual in charge of the purchase order approval process, for example. The screen 290 also includes a cancel option 295 and a send request option 296. For example, the send request option 296 may send the approval individual (associated with the designated email) the details of the virtual shopping cart for approval of a purchase order.

In step 208 of FIG. 2, if the approval individual has approved the purchase order, the tool may receive a purchase order that is associated with the user token authorization. Further, the method of the process 200 may include processing the order. The method of the process 100 and/or 200 may further include selecting a checkout option by one of the user and the purchase order approval contact prior to processing the order. The checkout option may be based on the purchase order approval associated with the user token authorization. For example, in step 210, the user or approval individual may check out of the virtual shopping cart to process the final order based on the user token authorization. For example, the user may utilize the received purchase order (and/or other processing information or payment methods) to process the final order in a secured virtual environment. Alternatively, the approval individual may utilize payment methods such as credit card information and/or the purchase order to process the final order that is associated with the user token authorization. Processing the final order may include entering shipping and/or billing information, preferred shipping method options, payment methods, and other processing information.

In embodiments, the application tools described herein may be integrated with third party services to enhance user (i.e., customer) collaboration with a vendor and/or manufacturer associated with the application tools. For example, the application tools may be integrated with CAD model software applications to launch 3D CAD models associated with vendor and/or manufacturer products from the application tools for the user as described herein. Further, the application tools may be integrated with robotic product monitoring and management operations to provide monitoring and notification features for an operation of tools associated with the robotic product, which may be a robot, as described in greater detail further below. Thus, the application tools described herein may be integrated with Industry 4.0 processes directed toward a trend of automation and data exchange in manufacturing technologies.

For example, a tool may be mounted onto and/or handled by the robotic product, and data sensors may read data provided by the robotic product such as tool orientation. Such data may be sent through notifications during tool operation to an operator for receipt and/or viewing, for example, on a smart device that may include the application tools as described herein. Moreover, the operator or user may be notified of faults in the manufacturing process by such notifications and/or alerts that are sent and that may be based on data generated by sensors on the robot. The robot may also include live cameras to generate a live video stream viewable on the application tool. Thus, a user may monitor tool operation during the manufacturing process, be notified that a tool is operating correctly, be warned of a malfunctioning tool, and/or may be warned when a tool component or part fails or the tool crashes.

Further, a system may monitor the robotic product, such as a robotic gripper, through a live camera to capture the process involving the robotic gripper and/or tools that the gripper handles, for examples. Thus, the one or more sensors may include a camera configured to generate a live video stream viewable on the GUI of the smart device. Alerts may be generated through the camera and/or other sensors to notify an operator or other system user, for example, when a process is going out of limits defined for operation and/or whether parts are not present when expects (for example, a sensor on a particular gripper may no longer be sensed and may be faulty). The system may also be integrated with on-lining access to CAD models and bill of materials, as described herein, such that alerts regarding repairs for particular parts, such as a robotic gripper that has a faulty sensor, may allow for a user to order such parts or place other spare part orders with the application tools as described herein, for example.

Thus, selecting the product from the product inventory with respect to the method of the process 100 and/or 200 may further include monitoring the product through one or more sensors of a robot associated with the product and configured to provide notification of product fault, generating an alert notification of product fault through the robot upon product failure, presenting the user with a re-order alert based on the alert notification of product fault, and selecting the product upon generation of the re-order alert automatically or by the user. For example, the application tool may be provided with a feature to automatically re-order or present a user with a re-order alert with respect to a part of component of a failing tool to limit an amount of downtime that may be associated with a malfunctioning tool that may no longer be active in a manufacturing process. For example, such tools that are monitored by the robot as described herein may also have barcodes etched onto their surfaces that may be read by the robot to access information regarding the appropriate parts necessary to order, which parts are necessary to rebuild or fix the tool and to generate an associated bill of materials of such parts to order through the application tool. The bill of materials may be automatically fed into the virtual shopping cart and the order may be processed by the user through the application tool as described herein. Thus, a method of the process 100 and/or the process 200 may include a scanning a bar code associated with the selected product that is etched into a surface of the selected product, or otherwise part of the surface of the selected product, or that is placed on a surface of the selected product as an adhesive label.

The robotic product may be a robot, such as a robotic gripper to grip tools during an operation product. For example, the robot may be a gripper to handle plastic mold components during a plastic demolding manufacturing operation, though other end of arm tools ("EOAT") or robots capable of handling a tool are within the scope of this disclosure. For example, vacuum cups providing a suction to handle components and/or gripper fingers utilizing pneumatics may be used.

Figure 14:
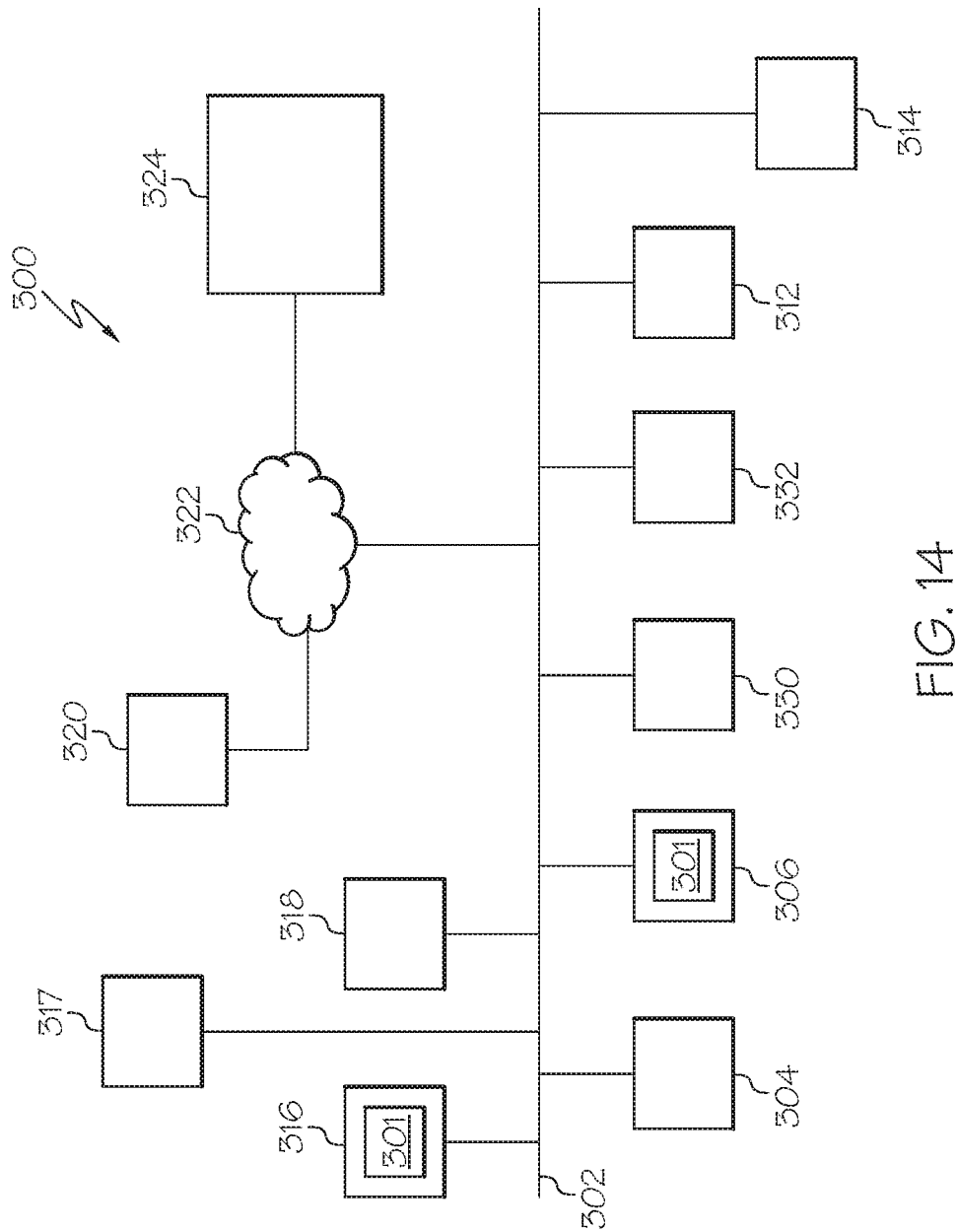
FIG. 14 schematically illustrates a system for implementing computer and software based methods to utilize the tools of FIGS. 1 and/or 2, according to one or more embodiments shown and described herein.

Referring to FIG. 14, a system 300 for implementing a computer and software-based method to utilize the virtual inventory management tools, as shown in FIGS. 1 and 2, is illustrated as being implemented along with using a graphical user interface (GUI) displaying, for example, a smart device application. The application may be associated with a vendor or manufacturer website as described herein and accessible at a user workstation (e.g., a computing device such as a mobile smart device 324), for example. The system 300 includes a communication path 302, one or more processors 304, a memory component 306, a product scan option component 312 to scan, for example, the physical product 332 with the associated bar code scanner feature 330, a storage or database 314, a virtual shopping cart component 316, a virtual toolbox component 317, a network interface hardware 318, a network 322, a server 320, and at least one smart device 324. In embodiments, the memory component 306 and/or the storage or database 314 store a user token authorization 301, which is described in greater detail below with respect to FIG. 15. The various components of the system 300 and the interaction thereof will be described in detail below.

While only one application server 320 and one user workstation smart device 324 is illustrated, the system 300 can include multiple workstations and application servers containing one or more applications that can be located at geographically diverse locations across a plurality of industrial sites. In some embodiments, the system 300 is implemented using a wide area network (WAN) or network 322, such as an intranet or the Internet. The smart device 324 may include digital systems and other devices permitting connection to and navigation of the network. Other system 300 variations allowing for communication between various geographically diverse components are possible. The lines depicted in FIG. 14 indicate communication rather than physical connections between the various components.

As noted above, the system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 300 includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

As noted above, the system 300 includes the memory component 306 which is coupled to the communication path 302 and communicatively coupled to the processor 304. The memory component 306 may be a non-transitory computer readable medium or non-transitory computer readable memory and may be configured as a nonvolatile or volatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 300 may include the processor 360 communicatively coupled to the memory component 306 that stores instructions that, when executed by the processor 360, cause the processor to perform one or more tool functions as described herein.

Still referring to FIG. 14, as noted above, the system 300 comprises the display such as a GUI on a screen of the smart device 324 for providing visual output such as, for example, information, the user interactive screen shot views as described above, graphical reports, messages, alerts, or a combination thereof. The GUI may present a vendor or manufacturer application tool for use on a mobile smart device such as a smart phone or tablet, for example, as described herein, which tool may utilize the product scan option component 312. For example, the product scan option component 312 may include and be associated with a smart device image scanner to read an image and/or a barcode scanner or barcode reader to read a barcode associated with a product that includes a machine-readable representation of product data.

The display on the screen of the smart device 324 is coupled to the communication path 302 and communicatively coupled to the processor 304. Accordingly, the communication path 302 communicatively couples the display to other modules of the system 300. The display can include any medium capable of transmitting an optical output such as, for example, a cathode ray tube, light emitting diodes, a liquid crystal display, a plasma display, or the like. Additionally, it is noted that the display or the smart device 324 can include at least one of the processor 304 and the memory component 306. While the system 300 is illustrated as a single, integrated system in FIG. 14, in other embodiments, the systems can be independent systems.

The system 300 comprises the virtual shopping cart component 316 and the virtual toolbox component 317 that allows a user to view and/or modify one or more selected orders to process to virtually manage inventory associated with one or more products to order from a vendor and/or manufacturer through a centralized system associated with and launchable from an application on a user's smart device. The virtual shopping cart component 316 and the virtual toolbox component 317 are coupled to the communication path 302 and communicatively coupled to the processor 304.

As will be described in further detail below, the processor 304 may process the input signals received from the system modules and/or extract information from such signals.

The system 300 includes the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 14, data from various applications running on the smart device 324 can be provided from the smart device 324 to the system 300 via the network interface hardware 318. The smart device 324 can be any device having hardware (e.g., chipsets, processors, memory, etc.) for communicatively coupling with the network interface hardware 318 and a network 322. Specifically, the smart device 324 can include an input device having an antenna for communicating over one or more of the wireless computer networks described above.

The network 322 can include any wired and/or wireless network such as, for example, wide area networks, metropolitan area networks, the Internet, an Intranet, satellite networks, or the like. Accordingly, the network 322 can be utilized as a wireless access point by the smart device 324 to access one or more servers (e.g., a server 320). The server 320 and any additional servers generally include processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

Figure 15:
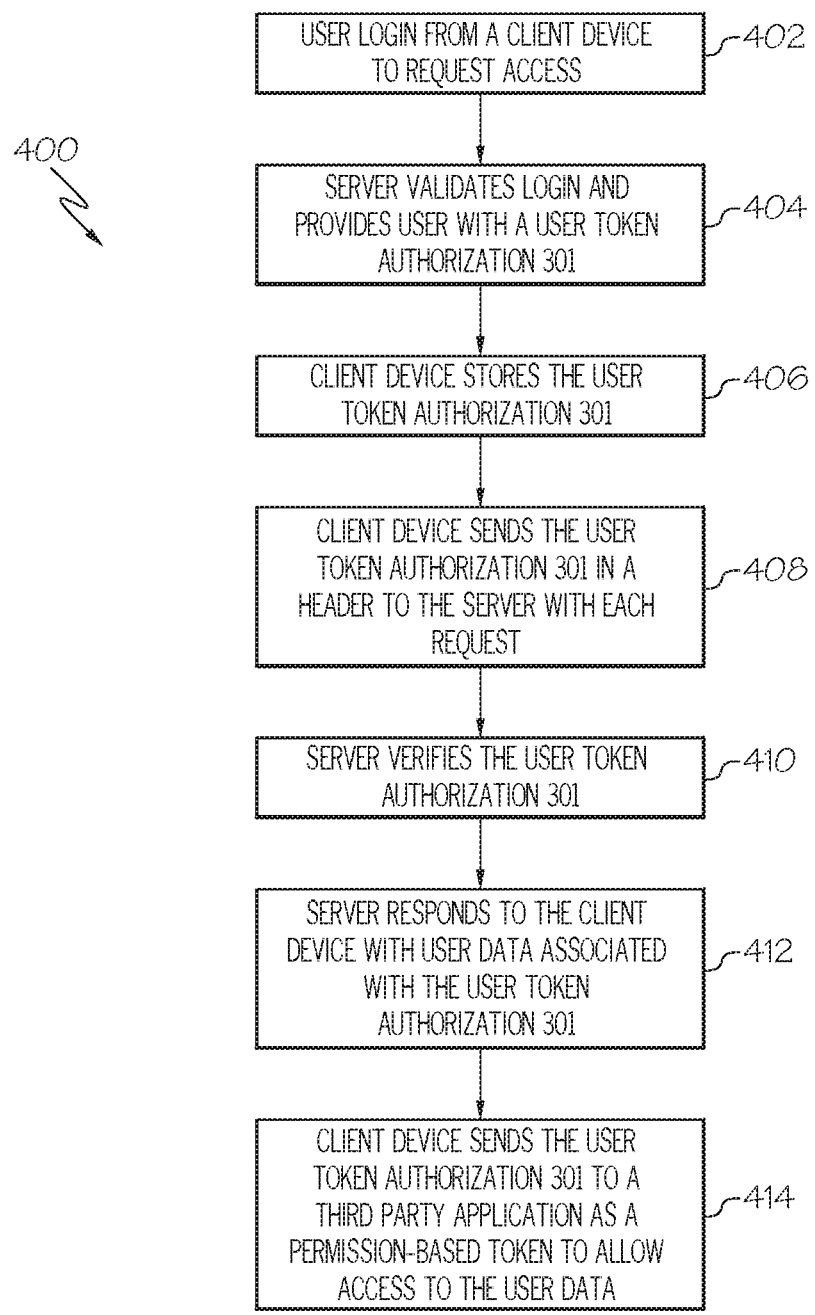
FIG. 15 is a flow chart of a process for managing a user token authorization for virtual inventory management, according to one or more embodiments shown and described herein.

FIG. 15 is a flow chart 400 of a process for managing a user token authorization 301 for virtual inventory management. For example, in step 402, a user logins from a client device such as a smart device 324 to request access to the application as described herein, for example. In step 404, an application server such as the server 320 validates the login and, if validated, provides the user with a user token authorization 301. The user token authorization 301 may be utilized as described above with respect to the described user token authorizations and processes 100 and 200 of FIGS. 1 and 2. In step 406, the client device stores the user token authorization 301 to allow for a stateless storage methodology such that user information is not stored on the server 320 or in a session (e.g., a record of each time a user is authenticated). Alternatively, the server 320 or a session may store the user token authorization 301 through a state storage methodology.

In step 408, the client device (e.g., the smart device 324) sends the user token authorization 301 in a header to the server 320 with each request for, for example, data from the server 320. In embodiments, a JSON web token ("JWT")

standard may be used across multiple programming languages, such as JavaScript, Haskell, PHP, Java, and the like. For example, the user token authorization 301 may be used in a URL, POST parameter, and HTTP header and sent to the server 320 (or to, as described below, a permitted third party). Thus, the API of an application tool as described herein allows for a quick and scalable authentication by passing information through the user token authorization 301. JWTs further are self-contained, including necessary data and transmitting such data about the JWT (such as through a header), a payload including user information and other token oriented information, and a signature that is, for example, a secret signature held by the server 320 so that the server 320 may verify existing tokens and sign new ones. In embodiments, the server 320 may also delete tokens and/or modify tokens. Alternatively or additionally, the client device may control, modify, and/or store data associated with the user token authorization 301 as described herein.

In step 410, the server 320 verifies the user token authorization 301. Upon verification, in step 412, the server 320 responds to the client device (e.g., the smart device 324) with the requested user data that is associated with the user token authorization 301.

In step 414, the client device sends the user token authorization 301 to a third party application as a permission-based token to allow access to the user data associated with the user token authorization 301. For example, through step 414, the process 200 of FIG. 2 may be followed such that a third-party purchase order approval individual may receive the user token authorization 301 and associated user data as described herein to allow the individual to either return a purchase order to the user of the user token authorization 301 and/or to checkout on behalf of the user.

The application tools described herein thus allow a user to access a centralized mobile platform to virtually manage inventory. The inventory may be managed directly from a location of one or more products to be ordered. The application tools allow authenticated users to search for vendor and/or manufacturer products, browse an associated online product catalog, virtually manage inventory through use of a virtual toolbox component within an application on a smart device, add products to order to a virtual shopping cart on the application, and submit orders securely through the vendor and/or manufacturer's mobile website. The user may also utilize a barcode scanner to scan cabinets and/or product bags that include barcodes, which will automatically link to the products to order within the application tool (which products may already be in the user's virtual toolbox, for example). The virtual toolbox may allow the user to set maximum stock levels for the user's inventory such that the tool may recommend to the user a quantity to order when the user places a product order as described above. The user may also be provided with current inventory stock levels at the vendor and/or manufacturer of the products to manage the user's inventory in accordance with the inventory existing at the vendor and/or manufacturer. Further, robotic monitoring through one or more sensors communicatively coupled to the application tools described herein may allow for alerts regarding and re-ordering of monitored products on, for example, a tool assembly line. The features of the application tools described herein are specific elements other than what is well-understood, routine, and conventional in the field. The features of the application tools described herein are rather directed toward elements that confine the claims to a particular useful application or are otherwise meaningful elements beyond a general linking of a use of a judicial exception to a particular technological environment. The features of the application tools described herein are directed toward elements that are significantly more than an attempt to patent just a method or device to monitor inventory. As such, the features cannot be interpreted as covering any and all forms of monitoring inventory and, thus, do not preempt usage of the concepts described herein in all fields.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for virtually managing a product inventory from an application on a smart device, the method comprising:

entering a login to the application on a graphical user interface (GUI) of the smart device by a user;
  receiving a user token authorization based on the login;
  selecting a product from the product inventory to generate a selected product associated with the user token authorization, wherein the product is selected from one or more search options on the GUI, the one or more search options comprising: a product search option in a virtual toolbox of the application, the virtual toolbox configured to store one or more products from the product inventory, wherein selecting the product from the product inventory comprises: monitoring the product by one or more electronic sensors associated with the product and configured to provide notification of product malfunction; generating an alert notification of product malfunction upon the product malfunction; presenting the user with a re-order alert based on the alert notification of product malfunction; and selecting the product upon generation of the re-order alert one of automatically or by the user;
  receiving detail of a maximum stock level associated with the selected product;
  receiving detail of a current inventory level associated with the selected product;
  subsequent to generating the re-order alert, generating a recommended order quantity as the order quantity based on the maximum stock level and the current inventory level;
  adding the order quantity of the selected product associated with the user token authorization to a virtual shopping cart as an order, wherein the virtual shopping cart is configured for integration with the virtual toolbox such that selection of the selected product from the virtual toolbox is configured to generate an option to auto-populate the virtual shopping cart with the selected product; and processing the order.

2. The method of claim 1, wherein the maximum stock level associated with the selected product is configured to be input by a user.

3. The method of claim 1, wherein the maximum stock level associated with the selected product is configured to be retrieved from storage in a memory of the smart device.

4. The method of claim 1, wherein the current inventory level associated with the selected product is configured to be input by a user.

5. The method of claim 1, wherein the current inventory level associated with the selected product is configured to be retrieved from storage in a memory of the smart device.

6. The method of claim 1, further comprising: adding the selected product to the virtual toolbox of the application when the selected product is not found within the virtual toolbox.

7. The method of claim 1, wherein a bar code associated with the selected product is etched into a surface of the selected product.

8. The method of claim 1, wherein a bar code associated with the selected product is placed on a surface of the selected product as an adhesive label.

9. The method of claim 1, further comprising: selecting a checkout option prior to processing the order.

10. The method of claim 1, further comprising: selecting a purchase order approval option to receive a purchase order approval prior to processing the order.

11. The method of claim 10, further comprising: selecting a purchase order approval contact; sending a purchase order approval request to the purchase order approval contact; receiving the purchase order approval associated with the user token authorization from the purchase order approval contact.

12. The method of claim 11, further comprising: selecting a checkout option by one of the user and the purchase order approval contact prior to processing the order, wherein the checkout option is based on the purchase order approval associated with the user token authorization.

13. The method of claim 1, wherein the one or more electronic sensors comprises a camera configured to generate a live video stream viewable on the GUI of the smart device.

14. The method of claim 1, further comprising: selecting an option to receive detail of the selected product on the GUI, wherein the detail comprises at least one of a product name, a product part number, a product image, and a product price.

15. A system for virtually managing a product inventory from an application on a mobile smart device, the system comprising:
 a server; and
 the mobile smart device comprising:
  a processor communicatively coupled to the server; and
  a non-transitory computer-readable memory storing instructions that, when executed by the processor and through the application, cause the processor to:
  receive a login to the application through a graphical user interface (GUI) of the mobile smart device by a user;
  receive a user token authorization from the server based on the login;
  receive a selection of a product from the product inventory to generate a selected product associated with the user token authorization, wherein the product is selected from one or more search options on the GUI, the one or more search options comprising: a product search option in a virtual toolbox of the application, the virtual toolbox configured to store one or more products from the product inventory, wherein the selection from the product inventory comprises: monitoring the product by one or more electronic sensors associated with the product and configured to provide notification of product malfunction; generating an alert notification of product malfunction upon the product malfunction; presenting the user with a re-order alert based on the alert notification of product malfunction; and selecting the product upon generation of the re-order alert one of automatically or by the user;
  receive detail of a maximum stock level associated with the selected product;
  receive detail of a current inventory level associated with the selected product;
  subsequent to generating the re-order alert, generate a recommended order quantity as the order quantity based on the maximum stock level and the current inventory level;
  add the order quantity of the selected product associated with the user token authorization to a virtual shopping cart as an order, wherein the virtual shopping cart is configured for integration with the virtual toolbox such that selection of the selected product from the virtual toolbox is configured to generate an option to auto-populate the virtual shopping cart with the selected product; and
  process the order.

16. A system for virtually managing a product inventory from an application on a mobile smart device, the system comprising:
 a server; and
 the mobile smart device comprising: a processor communicatively coupled to the server; and
 a non-transitory computer-readable memory storing instructions that, when executed by the processor and through the application, cause the processor to:
 receive a login to the application through a graphical user interface (GUI) of the mobile smart device by a user;
 receive a user token authorization from the server based on the login;
 receive a selection of a product from the product inventory to generate a selected product associated with the user token authorization, wherein the product is selected from one or more search options on the GUI, the one or more search options comprising: a product search option in a virtual toolbox of the application, the virtual toolbox configured to store one or more products from the product, wherein the selection from the product inventory comprises: monitoring the product by one or more electronic sensors associated with the product and configured to provide notification of product malfunction; generating an alert notification of product malfunction upon the product malfunction; presenting the user with a re-order alert based on the alert notification of product malfunction; and selecting the product upon generation of the re-order alert one of automatically or by the user;

receive detail of a maximum stock level associated with the selected product;
receive detail of a current inventory level associated with the selected product;
subsequent to generating the re-order alert, generate a recommended order quantity as an order quantity based on the maximum stock level and the current inventory level;
add the order quantity of the selected product associated with the user token authorization to a virtual shopping cart as an order; and
process the order.

* * * * *